United States Patent
Choi et al.

(10) Patent No.: US 9,040,132 B2
(45) Date of Patent: *May 26, 2015

(54) MEDICAL MULTILAYER FILM AND USE THEREOF

(75) Inventors: Yeon-Seok Choi, Seoul (KR); Hye-Kyung Kim, Incheon (KR); Eun-O Kim, Seoul (KR)

(73) Assignee: JW LIFE SCIENCE CORPORATION (KR)

( * ) Notice: Subject to any disclaimer, the term of this patent is extended or adjusted under 35 U.S.C. 154(b) by 22 days.

This patent is subject to a terminal disclaimer.

(21) Appl. No.: 13/263,008

(22) PCT Filed: Mar. 24, 2010

(86) PCT No.: PCT/KR2010/001806
§ 371 (c)(1),
(2), (4) Date: Oct. 5, 2011

(87) PCT Pub. No.: WO2010/117148
PCT Pub. Date: Oct. 14, 2010

(65) Prior Publication Data
US 2012/0034404 A1 Feb. 9, 2012

(30) Foreign Application Priority Data
Apr. 6, 2009 (KR) ........................ 10-2009-0029396

(51) Int. Cl.
*B32B 1/02* (2006.01)
*B32B 27/32* (2006.01)
(Continued)

(52) U.S. Cl.
CPC ........... *B32B 27/32* (2013.01); *Y10T 428/2495* (2015.01); *Y10T 428/1334* (2015.01);
(Continued)

(58) Field of Classification Search
USPC ............ 428/34.1, 34.2, 35.7, 35.9, 36.9, 35.2
See application file for complete search history.

(56) References Cited

U.S. PATENT DOCUMENTS

| 6,007,529 A | 12/1999 | Gustafsson et al. |
| 6,017,598 A | 1/2000 | Kreischer et al. |

(Continued)

FOREIGN PATENT DOCUMENTS

| JP | 06-286087 | 10/1994 |
| JP | 09-262948 | 10/1997 |

(Continued)

OTHER PUBLICATIONS

International Search Report—PCT/KR2010/001806 dated Nov. 4, 2010.
(Continued)

*Primary Examiner* — Marc Patterson
(74) *Attorney, Agent, or Firm* — Cantor Colburn LLP

(57) ABSTRACT

Disclosed are a medical multilayer film and use thereof. More specifically, disclosed are a medical multilayer film including: an outer layer comprising a propylene polymer selected from the group consisting of a polypropylene, a propylene copolymer and a combination thereof, an intermediate layer comprising 10 to 60% by weight of a propylene polymer selected from the group consisting of a polypropylene, a propylene copolymer and a combination thereof and 40 to 90% by weight of a thermoplastic elastomer, and an inner layer comprising 60 to 80% by weight of a propylene polymer selected from the group consisting of a polypropylene, a propylene copolymer and a combination thereof, 10 to 30% by weight of polyethylene, and 1 to 10% by weight of a thermoplastic elastomer, and use thereof. The multilayer film exhibits superior transparency, heat resistance and sealability as well as cold resistance, heat resistance, drop impact resistance and low-temperature impact resistance, thus being applicable to infusion solution containers, medical pouches, contrast medium containers and blood containers for packaging and administering medical solutions such as infusion solutions and blood.

11 Claims, 1 Drawing Sheet

(51) Int. Cl.
  *B32B 27/30* (2006.01)
  *B32B 25/08* (2006.01)
  *B32B 27/08* (2006.01)

(52) U.S. Cl.
  CPC ............ *Y10T428/1352* (2015.01); *B32B 25/08* (2013.01); *B32B 27/08* (2013.01); B32B 27/302 (2013.01); *B32B 2307/40* (2013.01); *B32B 2307/412* (2013.01); *B32B 2439/00* (2013.01); *B32B 2439/80* (2013.01); *B32B 2535/00* (2013.01)

(56) References Cited

U.S. PATENT DOCUMENTS

| | | |
|---|---|---|
| 6,261,655 B1 | 7/2001 | Rosenbaum et al. |
| 6,586,061 B1* | 7/2003 | Sasaki et al. .................. 428/35.2 |
| 8,491,562 B2* | 7/2013 | Choi et al. .................... 604/410 |

| | | | |
|---|---|---|---|
| 2002/0136916 A1* | 9/2002 | Cheung et al. ................. 428/517 |
| 2003/0099792 A1* | 5/2003 | Andersson et al. ........... 428/35.2 |
| 2003/0124370 A1* | 7/2003 | Suzuki et al. .................. 428/515 |
| 2007/0142557 A1* | 6/2007 | Karsten et al. ................. 525/240 |

FOREIGN PATENT DOCUMENTS

| | | |
|---|---|---|
| JP | 2001-226499 | 8/2001 |
| JP | 2002-011839 | 1/2002 |
| KR | 10-2000-0054613 | 9/2000 |
| KR | 10-0275989 | 9/2000 |
| KR | 10-2004-0086373 | 10/2004 |
| WO | 2008/127046 | 10/2008 |

OTHER PUBLICATIONS

PCT Written Opinion—PCT/KR2010/001806 issued on Nov. 4, 2010, citing JP 2002-011839, WO 2008-127046, JP 09-262948, and US 6261655.

* cited by examiner

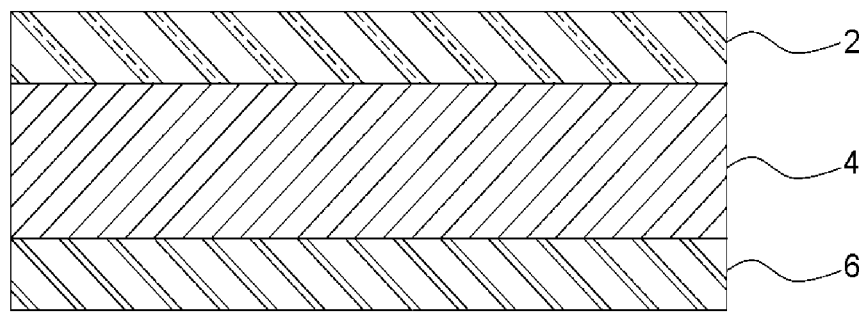
10

MEDICAL MULTILAYER FILM AND USE THEREOF

TECHNICAL FIELD

The present invention relates to a medical multilayer film which exhibits superior transparency, heat resistance and sealability as well as cold resistance, heat resistance, drop impact resistance and low-temperature impact resistance, thus being applicable to infusion solution containers, medical pouches, contrast medium containers and blood containers for packaging and administering medical solutions such as infusion solutions and blood, and use thereof.

BACKGROUND ART

Bags for packaging drugs require properties such as flexibility enabling easy shrinkage, transparency enabling easy observation of a use state of solutions, heat resistance to endure sterilization at a high temperature, heat sealability, drop impact resistance and drug stability.

Polyvinyl chloride has been the most generally used material for pouches to package medical solutions, and has sufficient flexibility, thus exhibiting superior properties such as transparency, heat resistance, modulus and impact resistance, required for bag molding. However, compounds such as DEHP, plasticizers added to secure these properties are harmful to humans and polyvinyl chloride is also harmful to the environment, thus being unsuitable for use. Techniques to provide alternatives to these substances are disclosed in Korean Patent Application No. 2000-32659 entitled "medical multilayer film", while the present invention provides a resin composition for films with superior cold resistance and impact resistance.

In general, medical containers to package drug solutions are sterilized by heating at about 121° C. for about 20 minutes or longer. The medical container, in particular, a film outer layer, should have heat resistance to endure high temperatures when exposed to hot water vapor in the heat-sterilization process. In addition, the film may break, thus being unsuitable for use, when medical containers are allowed to stand at a low temperature and impact is then applied thereto. Accordingly, there is an increasing need for development of films suitable for medical containers which can endure heat sterilization (that is, they have heat resistance) and are not readily broken at low temperatures (that is, they have cold resistance and impact resistance).

Patents associated with infusion solution containers among medical containers such as Korean Patent No. 10-0275989, Korean Patent Laid-open No. 2004-0086373, U.S. Pat. Nos. 6,017,598 and 6,007,529, and Japanese Patent Nos. 1994-286087 and 2001-226499) disclose monolayer or multilayer films or containers, each containing an inner layer made of an alpha-olefin or styrene polymer.

The infusion solution container may have any one selected from a variety of shapes and, in a representative structure thereof, the infusion solution container includes an inner bag and an outer bag which surrounds the inner bag to protect the same and serves as a gas barrier to block permeation of gas such as oxygen. The infusion solution container may be selected from functional bags for infusion solutions including a plurality of (two or more) chambers and general flexible plastic containers for infusion solutions including one chamber. However, as compared to the functional bag for infusion solutions including the plurality of chambers, the general flexible plastic container for infusion solutions including one chamber exhibits easy peeling in which an inner sealing layer thereof can be readily peeled and secures cost-competitiveness through use of optimally priced materials. Flexible containers containing infusion solutions may break during transport.

In particular, when a great amount of solutions are packaged together to reduce transport costs, breakage may more readily occur. To prevent loss caused by breakage, sufficient drop impact resistance and low-temperature impact resistance enabling storage and utilization even at low temperatures in winter are further important.

DISCLOSURE

Technical Problem

To solve the mentioned problems, it is one object of the present invention to provide a medical multilayer film which exhibits cold resistance, heat resistance, drop impact resistance and low-temperature impact resistance as well as transparency, heat resistance and sealability.

In addition, it is another object of the present invention to provide an infusion solution container, a medical pouch, a contrast medium container and a blood container, each including a medical multilayer film, for packaging and injecting medical solutions such as infusion solutions or blood.

Technical Solution

In accordance with an aspect of the present invention, the above and other objects can be accomplished by the provision of a medical multilayer film including: an outer layer comprising a propylene polymer selected from the group consisting of a polypropylene, a propylene copolymer and a combination thereof; an intermediate layer comprising 10 to 60% by weight of a propylene polymer selected from the group consisting of a polypropylene, a propylene copolymer and a combination thereof, and 40 to 90% by weight of a thermoplastic elastomer; and an inner layer made of 60 to 80% by weight of a propylene polymer selected from the group consisting of a polypropylene, a propylene copolymer and a combination thereof, 10 to 30% by weight of polyethylene, and 1 to 10% by weight of a thermoplastic elastomer.

In accordance with another aspect of the present invention, provided is an infusion solution container including the medical multilayer film.

In accordance with another aspect of the present invention, provided is a medical pouch including the medical multilayer film.

In accordance with another aspect of the present invention, provided is a contrast medium container including the medical multilayer film.

In accordance with yet another aspect of the present invention, provided is a blood container including the medical multilayer film.

Advantageous Effects

The multilayer film exhibits considerably superior transparency, heat resistance and sealability, as well as considerably superior cold resistance, heat resistance, drop impact resistance and low-temperature impact resistance. The multilayer film is applicable to infusion solution containers, medical pouches, contrast medium containers and blood containers for packaging and administering medical solutions such as infusion solutions and blood. The manufactured container is useful for a variety of medical industries due to excellent price competiveness thereof.

DESCRIPTION OF DRAWINGS

The above and other objects, features and other advantages of the present invention will be more clearly understood from the following detailed description taken in conjunction with the accompanying drawings, in which:

FIG. 1 is a sectional view illustrating a multilayer film according to one embodiment of the present invention.

BEST MODE

Reference will now be made in detail to preferred embodiments, examples of which are illustrated in the accompanying drawings.

In the drawings, it is preferably understood that the shapes and the like of respective elements are exaggerated for clearer description. In the drawings, elements indicated by the same numerals refer to the same elements. In addition, it will be understood that, when an element is referred to as being formed "on" another element, these elements may directly contact each other or may be indirectly arranged such that a third element is interposed therebetween. For example, the multilayer film may include an additional layer such as an adhesive layer, a water vapor barrier layer, or a gas barrier layer.

FIG. 1 is a sectional view illustrating a multilayer film according to one embodiment of the present invention.

Referring to FIG. 1, the medical multilayer film (10) according to the present invention includes an outer layer 2, an intermediate layer 4 and an inner layer 6.

The outer layer 2 protects the overall films and secures suitable physical properties to enable printing on the surface thereof. That is, although the inner layer is adhered, it should have no effect on workability. For this reason, suitable printability and heat resistance are required and compositions are thus designed to secure qualities of containers and to suit rapid processes.

For example, a material for the outer layer 2 includes a propylene polymer selected from the group consisting of a polypropylene, a propylene copolymer, and a combination thereof and is preferably polypropylene.

As used herein, the term "polypropylene" includes polypropylene which is prepared using propylene monomers alone and includes all of isotactic, syndiotactic and atactic polypropylene. Preferably, the polypropylene has a melt index (in accordance with ASTM D1238) of 7 to 9 g/10 min, a density of 0.85 to 0.95, and a softening point of 145 to 165° C.

As used herein, the term "propylene copolymer" means a copolymer which contains propylene as a main ingredient and contains a predetermined ratio of comonomer. Representative examples of the propylene copolymer include a propylene-ethylene copolymer which contains propylene as a main ingredient and ethylene as a comonomer; and a propylene-ethylene-alpha-olefin copolymer which contains propylene as a main ingredient and contains ethylene and one or more types of alpha-olefin as comonomers, and the like. At this time, the alpha-olefin is a hydrocarbon having 3 to 12 carbon atoms and, for example, may be selected from the group consisting of 1-butene, 1-pentene, 1-hexene, 4-methyl-1-pentene, 1-heptene, 1-octene, 1-nonene, 1-decene, 1-undecene, 1-dodecene, and a combination thereof.

The propylene copolymer may be a random copolymer, a block copolymer or a graft copolymer and may be suitably selected depending on intended application. In addition, preferably, the propylene copolymer has similar physical property ranges to those of polypropylene.

The intermediate layer 4 contains a great amount of thermoplastic elastomers, thus securing flexibility and absorbing impact. In particular, advantageously, the intermediate layer 4 secures superior drop impact resistance.

The material for the intermediate layer 4 contains one type of propylene polymer selected from the group consisting of a polypropylene, a propylene copolymer, and a combination thereof, and a thermoplastic elastomer.

The polypropylene and propylene copolymer are the same as described in the outer layer 2. Preferably, the propylene copolymer is a random copolymer, and more preferably, the propylene copolymer has a melt index (in accordance with ASTM D1238) of 6.5 to 8.5 g/10 min, a density of 0.85 to 0.95, a melting point of 120 to 140° C. and a softening point of 105 to 125° C.

As used herein, the term "thermoplastic elastomer" means a styrene elastomer, and preferably means a hydrogenated styrene elastomer.

The thermoplastic elastomer has a wide flexibility range and high restoring force, thus positively affecting physical properties of the multilayer film 10. The intermediate layer 4 according to the present invention controls the modulus of the multilayer film 10 depending on the content of thermoplastic elastomers. In addition, the thermoplastic elastomer to secure a thickness of about 60 to 94% relative to the overall thickness of the multilayer film 10 and thus secure flexibility is limited to a saturated thermoplastic styrene elastomer which is present in an suitable amount of 40 to 90% by weight and exhibits superior heat resistance and excellent low-temperature impact properties.

Any thermoplastic elastomer may be used so long as it is saturated by adding hydrogen to double bonds of an unsaturated thermoplastic elastomer, and as a representative example, the thermoplastic elastomer is selected from the group consisting of hydrogenated SIBS (styrene-isoprene-butadiene block copolymers), hydrogenated SBS (styrene-butadiene-styrene copolymers), hydrogenated SIS (styrene-isoprene-styrene copolymers), hydrogenated SEBS (styrene-ethylene-butadiene block copolymers), hydrogenated SEPS (styrene-ethylene-propylene block copolymers), hydrogenated SEEPS (styrene-ethylene-ethylene-propylene block copolymers), hydrogenated SBC (styrene-butadiene block copolymers), hydrogenated SBPS (styrene-ethylene-propylene-styrene copolymers) and combinations thereof. Preferred is hydrogenated SEBS.

The thermoplastic elastomer has a specific gravity of 0.85 to 0.95, a melt index (in accordance with ASTM D1238) of 1 to 3 g/10 min, and a 100% modulus of 0.5 to 0.7.

The contents of propylene polymer and the thermoplastic elastomer are controlled taking into consideration the action and functions of the intermediate layer 4. Preferably, the propylene polymer is present in an amount of 10 to 60% by weight and the thermoplastic elastomer is present in an amount of 40 to 90% by weight. When the content of the propylene polymer is excessively high, flexibility may be disadvantageously deteriorated. On the other hand, when the content of the thermoplastic elastomer is excessively high, suitable thermal stability cannot be secured.

The inner layer 6 is present as the surface with which a drug solution directly comes in contact. It is preferable that the ratio of resins having a similar melting point is high, since the inner layer should be joined together in the process of manufacturing bags, from a viewpoint of being advantageous in determining process conditions during processing of medical containers.

The inner layer 6 according to the present invention contains a propylene polymer selected from the group consisting of a polypropylene, propylene copolymers and a combination thereof, polyethylene and a thermoplastic elastomer.

During thermal adhesion, the inner layer 6 is melted earlier than the intermediate layer 4 and the outer layer 2 and then sealed due to lower melting point thereof than the layers. In addition, when the content of the propylene polymer is excessively high, the melting point of the inner layer 6 is excessively high, the outer layer 2 has a similar heat resistance temperature to the inner layer 6, and the outer layer 2 and the intermediate layer 4 are melted together, and thus scorched and stuck, thus causing deterioration in sealability. For this reason, the polyethylene and the thermoplastic elastomer should be present at a suitable ratio. To improve adhesive force, the ratio of the thermoplastic elastomer is limited to a minimum amount of 1 to 10% by weight. When a saturated form of the thermoplastic elastomer, that is, hydrogenated thermoplastic styrene elastomer is used, low-temperature impact resistance of the multilayer film 10 can be secured. When an ethylene alpha-olefin copolymer is used as the polyethylene, elasticity, durability and processability of the multilayer film 10 can be secured.

The polypropylene, the propylene copolymer and the thermoplastic elastomer used for the inner layer 6 are as described above.

Preferably, the propylene copolymer is a random-type copolymer, and more preferably has a melt index (in accordance with ASTM D1238) of 6.5 to 8.5 g/10 min, a density of 0.85 to 0.95, a melting point of 120 to 140° C. and a softening point of 105 to 125° C.

In addition, the thermoplastic elastomer has a specific gravity of 0.85 to 0.95, a melt index (in accordance with ASTM D1238) of 1 to 3 g/10 min and a 100% modulus of 0.5 to 0.7.

The polyethylene may be any known polyethylene such as a copolymer of low-density polyethylene (LDPE), linear low-density polyethylene (LLDPE), high-density polyethylene (HDPE), or ultrahigh-density polyethylene (VLDPE), and alpha-olefin. Preferably, the polyethylene is a polyethylene-alpha-olefin copolymer. More preferably, the polyethylene has a melt index (in accordance with ASTM D1238) of 4 to 6 g/10 min, a density of 0.8 to 1.0, and a melting point of 50 to 120° C. Preferably, the polyethylene may be a copolymer of ethylene and alpha-olefin.

The inner layer 6 contains 60 to 80% by weight of a propylene polymer, 10 to 30% by weight of polyethylene, and 1 to 10% by weight of a thermoplastic elastomer. Such a content range secures physical properties of the inner layer 6 to realize performance thereof. When the content is out of this range, the mentioned effects cannot be sufficiently secured.

In the multilayer film 10 including the outer layer 2, the intermediate layer 4 and the inner layer 6, a variety of additives may be used for any one or all of the plurality of layers, if necessary. The additive is not limited in the present invention and may be any known additive used in the art. Examples of additives include antioxidants, anti-tack agents, processing aids, pigments, antistatic agents and the like. The content of the additive is preferably maintained at a minimal level, to minimize extraction of the additive into medical solutions during heat-sterilization.

The multilayer film 10 according to the present invention is manufactured by controlling the thickness of respective layers so that the multilayer film 10 can exhibit suitable physical properties and be thus suitable for medical containers. Preferably, the thicknesses of the outer layer, the intermediate layer and the inner layer are 3 to 20%, 60 to 94%, and 3 to 20% with respect to the total thickness of the multilayer film. Specifically, the thicknesses of the outer layer 2, the intermediate layer 4 and the inner layer 6 are preferably adjusted to 5 to 60 µm, 110 to 250 µm and 5 to 60 µm, respectively. When the thickness of each layer is lower than the range defined above, effects to be obtained through configuration of respective layers cannot be sufficiently secured. For example, when the thickness of the outer layer 12 is lower than the range defined above, heat resistance is deteriorated. On the other hand, when the thickness of the outer layer 12 exceeds this range, flexibility and heat sealability of the overall film are deteriorated.

In addition, the multilayer film 10 according to the present invention is basically adhered at a temperature which is slightly lower than a melting point of materials used.

That is, the outer layer 2 has a melting point of 145 to 165° C., the intermediate layer 4 has a melting point of 140 to 155° C., and the inner layer 6 has a melting point of 125 to 140° C.

The medical multilayer film according to the present invention is not limited particularly in the present invention and may be manufactured by any method known in the art.

Representatively, the multilayer film may be manufactured by co-extrusion, or lamination to adhere films.

Co-extrusion is a method in which two or more different materials are melted in different extruding machines, the melted resins are injected into a die, a plurality of layers are laminated and the laminated materials are cooled by a variety of methods. Co-extrusion enables formation of resin extruded materials to a predetermined thickness with improved efficiency and reduces deterioration in qualities of resins during extrusion, thus advantageously maintaining properties of respective layers, and obtaining products with high transparency and flexibility. Co-extrusion is divided into an inflation method using a circular die and a T-die method using a flat die. The inflation method is useful in view of managing clearness of the film and the T-die method is useful in view of securing thickness uniformity.

The manufacture of a multilayer film through co-extrusion is carried out at 170 to 250° C., preferably 200 to 230° C. At this time, difference in melting flow rate (MFR) between the resins to form respective layers is preferably reduced in order to uniformize thickness and extrusion ability.

The multilayer film thus prepared has haze properties, thermal adhesion strength, tensile strength, modulus and elongation suitable for a variety of medical containers. Preferably, the multilayer film has a thickness (ASTM D 882) of 180 to 250 µm, a haze (ASTM D 1003) after sterilization of 10% or less, tensile strength (ASTM 882) of 250 kgf/cm$^2$ or more, modulus (ASTM D 882) of 300 to 1200 kgf/cm$^2$, and elongation (ASTM 882) of 900% or more. In addition, the multilayer film has a suitable impact resistance at high temperatures and low temperatures.

The medical multilayer film according to the present invention may be applied to medical containers including bags having one or more chambers, for general infusion solution products. Preferably, the medical multilayer film may be applied to a variety of infusion solution containers, medical pouches, contrast medium containers, or blood containers requiring high drop impact resistance.

The medical container can significantly reduce the risk of breakage during transportation and handling due to the multilayer film having high drop impact resistance and low-temperature impact resistance and secure cost competiveness through use of materials having an optimum price.

BEST MODE

Now, the present invention will be described in more detail with reference to the following Examples. These examples are only provided to illustrate the present invention and should not be construed as limiting the scope and spirit of the present invention.

Examples 1 to 3 and Comparative Examples 1 to 5

Multilayer films were manufactured using an extrusion method in accordance with the composition set forth in Table 1. At this time, to maintain clearance of the films, all operations were carried out in an extrusion downward inflation film machine in a clean room using water-cooling. Molding was carried out by melting a raw material using an extrusion machine, blowing air into a die and molding a film having a cylindrical tube shape while the roller passed through the film. The outer layer, the intermediate layer and the inner layer of the manufactured multilayer film had thicknesses of 20 μm, 160 μm and 20 μm, respectively.

TABLE 1

| No. | Outer layer | Intermediate layer | | Inner layer | | |
|---|---|---|---|---|---|---|
| Examples | (1) HOMO PP | (2) PP | (3) SEBS | (4) PP | (5) SEBS | (6) PE |
| Ex. 1 | 100 wt % | 50 wt % | 50 wt % | 70 wt % | 20 wt % | 10 wt % |
| Ex. 2 | 100 wt % | 50 wt % | 50 wt % | 80 wt % | 10 wt % | 10 wt % |
| Ex. 3 | 100 wt % | 60 wt % | 40 wt % | 70 wt % | 20 wt % | 10 wt % |
| Comp. Ex. 1 | 100 wt % | 50 wt % | 50 wt % | 85 wt % | 15 wt % | — |
| Comp. Ex. 2 | 100 wt % | 50 wt % | 50 wt % | 90 wt % | 10 wt % | — |
| Comp. Ex. 3 | 100 wt % | 50 wt % | 50 wt % | 100 wt % | — | — |
| Comp. Ex. 4 | 100 wt % | 80 wt % | 20 wt % | 70 wt % | 20 wt % | 10 wt % |
| Comp. Ex. 5 | 100 wt % | 90 wt % | 10 wt % | 70 wt % | 20 wt % | 10 wt % |

(1) HOMO PP: melt index of 8 g/10 min, density of 0.90, softening point of 150° C., product available from Honam Petrochemical Corp.
(2) Propylene-ethylene-butene terpolymer: melt index of 7.0 g/10 min, density of 0.90, melting point of 125° C., softening point of 110° C., product available from SK chemical Co., Ltd.
(3) SEBS: specific gravity of 0.90, melt index of 2 g/10 min, 100% modulus of 0.6 MPa, products available from Kraton Performance Polymers, Inc.
(4) Propylene-ethylene-butene terpolymer: melt index of 7.0 g/10 min, density of 0.90, melting point of 125° C., softening point of 110° C., products available from SK chemical Co., Ltd.
(5) SEBS: specific gravity of 0.95, melt index of 2 g/10 min, 100% modulus of 0.6 MPa, products available from Kumho Petrochemical Co., Ltd.
(6) PE: melt index of 5 g/10 min, density of 0.95, melting point of 60° C., products available from DOW CHEMICAL Co. Ltd.

Experimental Example 1

The haze properties (ASTM D 1003), sealability and drop impact resistance of multilayer films manufactured in Examples and Comparative Examples were measured.

Regarding haze, 10% or less was represented by "good", 10 to 20% was represented by "medium" and 20% or more was represented by "poor".

In addition, sealability was represented based on the following criteria.

Good: wide optimum equipment criteria
Difficult good equipment application and absence of <detachment (gapping)> or <scorching and sticking> due to wide sealable temperature and time ranges
Medium: narrow optimum equipment criteria:
Difficult equipment application, but absence of <detachment> or <scorching and sticking> due to narrow sealable temperature and time ranges Drop impact resistance was obtained by performing sterilization, dropping each bag once in respective drop directions (free drop from a height of 1.8 m), testing at least 30 EA, checking the number of popped bags and calculating the number of popped bags as a percentage (%). At this time, high-temperature drop impact resistance was tested after sterilization and storage at a temperature of 23 to 25° C. (drug temperature; 23 to 25° C.) for 7 days, and low-temperature drop impact resistance was tested after sterilization and storage at a temperature of 4 to 5° C. (drug temperature; 4 to 5° C.) for 5 days.

TABLE 2

| | | | Drop impact resistance (%) | |
|---|---|---|---|---|
| No. Examples | Haze after sterilization (%) | Sealability | High temperature | Low temperature |
| Ex. 1 | Good | Good | 6.3 | 24.0 |
| Ex. 2 | Good | Good | 6.7 | 16.7 |
| Ex. 3 | Good | Good | 5.0 | 24.0 |
| Comp. Ex. 1 | Good | Medium | 16.3 | 34.5 |
| Comp. Ex. 2 | Good | Scorched and stuck | 30.0 | 46.7 |
| Comp. Ex. 3 | Good | Scorched and stuck | 32.5 | 73.3 |
| Comp. Ex. 4 | Good | Good | 32.2 | 67.5 |
| Comp. Ex. 5 | Good | Good | 65.0 | 100 |

As can be seen from Table 2, the multilayer films of Examples 1 to 3 according to the present invention exhibited superior results with respect to all properties.

On the other hand, in multilayer films of Comparative Examples 2 and 3, the outer layers were scorched and stuck during sealing. The reason for this is that the content of propylene polymer constituting the inner layer is relatively high and sealing temperature increases.

Experimental Example 2

The multilayer films were measured in the same manner as mentioned above except that thicknesses of respective layers were changed as set forth in Table 3 and physical properties thereof were then measured. At this time, the multilayer film had a composition as set forth in Example 2.

TABLE 3

| | | | | | | Drop impact resistance (%) | |
|---|---|---|---|---|---|---|---|
| No. Examples | Outer layer | Intermediate layer | Inner layer | Haze after sterilization (%) | Sealability | High temperatures | Low temperatures |
| Ex. 4 | 15% | 75% | 10% | Good | Good | 11.7 | 21.7 |
| Ex. 5 | 10% | 80% | 10% | Good | Good | 6.7 | 16.7 |
| Ex. 6 | 5.8% | 86.4% | 7.8% | Good | Good | 9.2 | 25.0 |

TABLE 3-continued

| No. Examples | Outer layer | Intermediate layer | Inner layer | Haze after sterilization (%) | Sealability | Drop impact resistance (%) | |
|---|---|---|---|---|---|---|---|
| | | | | | | High temperatures | Low temperatures |
| Comp. Ex. 6 | 2% | 86% | 10% | Medium | Medium | 22.5 | 40.0 |
| Comp. Ex. 7 | 1% | 88% | 10% | Poor | Scorched and stuck | 51.7 | 81.7 |

As can be seen from Table 3, the multilayer films of Examples 4 to 6 according to the present invention exhibited superior results with respect to all properties.

On the other hand, the multilayer films of Comparative Examples 6 and 7 exhibited low haze properties, low sealability, and considerable deterioration in drop impact resistance. The multilayer films of Comparative Examples 6 and 7 exhibited a relatively high content of thermoplastic elastomers in the intermediate layer of the multilayer film due to a thin outer layer and a relatively thick intermediate layer, and thus deteriorated haze. In addition, when the thickness ratio of the outer layer was decreased, heat resistance is insufficient and the outer layer is scorched and stuck.

INDUSTRIAL APPLICABILITY

The medical multilayer film of the present invention is useful for infusion solution containers, medical pouches, contrast medium containers and blood containers.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

The invention claimed is:

1. A medical multilayer film for packaging and administering medical solutions comprising:
   an outer layer comprising a propylene polymer selected from the group consisting of a polypropylene, a propylene copolymer, and a combination thereof;
   an intermediate layer comprising 10 to 60% by weight of a propylene polymer selected from the group consisting of a polypropylene, a propylene copolymer in which propylene is a main component of the copolymer, and a combination thereof, and 50 to 90% by weight of a styrene-based thermoplastic elastomer; and
   an inner layer consisting essentially of a blend of 60 to 80% by weight of a copolymer of propylene, ethylene and 1-butene, 10 to 30% by weight of a copolymer of ethylene and alpha-olefin, and 1 to 10% by weight of a styrene-based thermoplastic elastomer.

2. The medical multilayer film according to claim 1, wherein the alpha-olefin is selected from the group consisting of 1-butene, 1-pentene, 1-hexene, 4-methyl-1-pentene, 1-heptene, 1-octene, 1-nonene, 1-decene, 1-undecene, 1-dodecene, and combinations thereof.

3. The medical multilayer film according to claim 1, wherein the thermoplastic elastomer is selected from the group consisting of hydrogenated SIBS (styrene-isoprene-butadiene block copolymers), hydrogenated SBS (styrene-butadiene-styrene copolymers), hydrogenated SIS (styrene-isoprene-styrene copolymers), hydrogenated SEBS (styrene-ethylene-butadiene block copolymers), hydrogenated SEPS (styrene-ethylene-propylene block copolymers), hydrogenated SEEPS (styrene-ethylene-ethylene-propylene block copolymers), hydrogenated SBC (styrene-butadiene block copolymers), hydrogenated SBPS (styrene-ethylene-propylene-styrene copolymers), and combinations thereof.

4. The medical multilayer film according to claim 1, wherein, based on the total thickness of the multilayer film, the thickness of the outer layer is 3 to 20%, the thickness of the intermediate layer is 60 to 94%, and the thickness of the inner layer is 3 to 20%.

5. The medical multilayer film according to claim 1, wherein, in the multilayer film, the outer layer has a melting point of 145 to 165° C., the intermediate layer has a melting point of 140 to 155° C., and the inner layer has a melting point of 125 to 140° C.

6. An infusion solution container comprising the medical multilayer film of claim 1.

7. A medical pouch comprising the medical multilayer film of claim 1.

8. A contrast medium container comprising the medical multilayer film of claim 1.

9. A blood container comprising the medical multilayer film of claim 1.

10. The medical multilayer film according to claim 1, wherein the alpha-olefin is selected from the group consisting of 1-butene, 1-pentene, 1-hexene, 4-methyl-1-pentene, 1-heptene, 1-octene, 1-nonene, 1-decene, 1-undecene, 1-dodecene, and combinations thereof.

11. The medical multilayer film according to claim 1, wherein the propylene polymer of the intermediate layer is a polypropylene homopolymer.

* * * * *